UNITED STATES PATENT OFFICE.

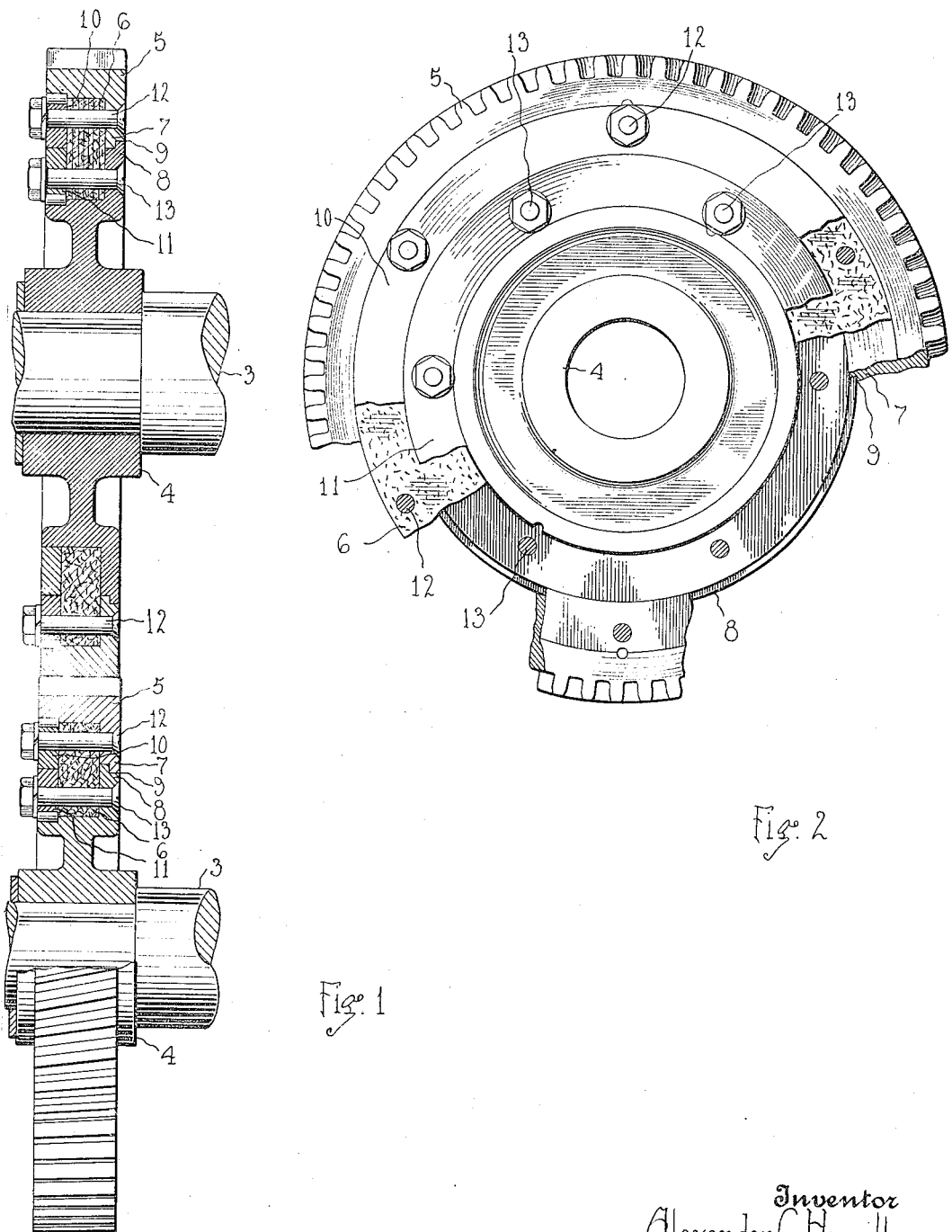

ALEXANDER C. HAMILTON, OF PONTIAC, MICHIGAN, ASSIGNOR TO GENERAL MOTORS CORPORATION, OF DETROIT, MICHIGAN, A CORPORATION OF DELAWARE.

CUSHIONED GEAR.

1,422,440.      Specification of Letters Patent.      Patented July 11, 1922.

Application filed August 23, 1919. Serial No. 319,454.

*To all whom it may concern:*

Be it known that I, ALEXANDER C. HAMILTON, a citizen of the United States, and resident of Pontiac, Oakland County, State of Michigan, have invented certain new and useful Improvements in Cushioned Gears, of which the following is a specification.

My invention relates to gearing, and especially to yieldable or resilient gears wherein means are provided for cushioning the stresses transmitted from the hub to the rim of the gear, or vice versa, when the gear is in use.

The object of my invention is to provide an improved form of cushioned gear of the type and for the purpose above referred to, and wherein an improved construction and arrangement of the yieldable member through which force is transmitted from one part of the gear to another is provided.

A further object of my invention is to provide an improved form of resilient gear in which the stresses tending to move one or the other of the hub or rim portion of the gear parallel with the axis of the shaft whereby the gear is supported, are resisted.

A further object of my invention is to provide a yieldable or cushioned gear structure designed especially for use in connection with gear wheels comprising a hub and rim portion driven one from the other, and in which the teeth of the gears are inclined or spiral in form; and in which the lateral thrust tending to move one or the other of said elements parallel with the axis of the shaft which carries the gear, and which thrust is due to the inclination of the teeth at the periphery thereof, are taken up and resisted by interengaging flanges or ledges upon the hub and rim portion; to thereby strengthen the gear against forces tending to move the parts sideways relative to one another and prevent the yieldable member thereof from being subjected to shearing stresses.

In the drawing accompanying and forming a part of this specification and wherein the preferred embodiment of my invention is illustrated:

Figure 1 is a view mainly in section upon a vertical central plane, and showing two intermeshing gears made in accordance with my invention; and, Figure 2 is a view showing the gear in side elevation, portions thereof being broken away in order to better illustrate certain features of construction and arrangement of the parts thereof.

Referring to the drawing, the reference numerals 3 designate shafts to which improved gears made in accordance with my invention are secured, and which shafts may either one of them be either driven from the gear which it carries or may drive the gear to transmit motion to another gear and shaft, as will be appreciated.

My improved gear comprises a hub portion 4 adapted to be secured to a shaft, and a rim portion 5 operatively connected with the hub portion through and by means of a resilient member 6; which member may be made from layers of cloth or similar fabric, from a block of resilient material, and in fact from any material which will have a cushioning effect and act to absorb the shock due to the transmission of force from one of the gear elements to the other when the gear is in use.

The rim portion 5 and hub portion 4 are provided with annular recesses or rabbets formed in the outer periphery of the hub and the inner periphery of the rim, which rabbets together form an annular channel in the side of the gear and which is located partly in one and partly in the other of the elements thereof, and within which annular channel the resilient member 6 is located.

The inwardly extending flange or ledge 7 of the side wall of the rim portion, and 8 of the hub portion provide the end or bottom wall of the channel; and the free or meeting edges of these side wall portions are rabbetted and are in interlocking engagement with one another, as shown at 9, to thereby prevent lateral movement of the rim as will be appreciated; the construction shown in the upper gear in Figure 1 being a construction which will prevent movement of the rim portion thereof to the right, while the form of joint between the side flanges of the rim portion and the hub of the lower gear in said figure is such as to prevent movement of the rim portion thereof to the left.

The forces tending to move the rim portions laterally are due to the fact that the teeth of the two gears in mesh with one another are inclined, as shown, so that when the gears are in operation there is a tendency of the rim of the lowermost gear to move laterally in one direction, and a similar tendency of the rim portion of the upper gear to move laterally in the opposite direction.

The yieldable member or element 6 whereby the hub and rim portions of the gear are connected with one another is obviously annular in form, and fills or substantially fills the channel within which it is located, and said connecting member is held in place within the channel by two concentric retaining rings 10, 11 located within the open side of the channel and overlying the said connecting member.

These retaining rings are secured in place and the yieldable connecting member held within the channel, and all the parts of the gear secured together to form a single unitary structure by means of two series of fastening bolts, the bolts of the outer series being indicated by the reference numeral 12 and those of the inner series being indicated by the reference numeral 13.

These fastening bolts extend through the inwardly and outwardly projecting ledges 7 and 8 of the side walls of the gear portions through the yieldable connecting member 6, and through the annular retaining rings 10 and 11, as will be appreciated, whereby the parts of the gear are secured together to thereby form a single unitary structure.

In view of the premises it will be appreciated that the yieldable connecting member between the hub and rim portions of my improved gear is enclosed within an annular recess provided for its reception, and is protected on all sides by metallic walls of the gear sections and of the rings whereby it is retained within the channel provided for it partly in one and partly in the other of the parts of the gear. Furthermore, the interlocking connection provided between the meeting portions of the side walls of the gear sections or members which provide the bottom wall of the channel within which the yieldable member is located, prevents lateral or sideways movement of either the hub or the rim portions of the gear relative to the other part thereof, and provides a construction which permits yieldable or cushioned gears to be provided with inclined or spiral teeth without thereby subjecting the yieldable connecting member between the parts to shearing action.

Having thus described and explained my invention, I claim and desire to secure by Letters Patent:

1. A resilient gear of the class described comprising concentric hub and rim portions having an annular channel formed in their sides and partly in one and partly in the other of said members, and the bottom or end wall of which channel is formed by annular flanges at the sides of said hub and rim the free edges of which flanges engage with one another to thereby prevent lateral movement of said rim; an annular yieldable connecting member located within said channel; two concentric retaining rings located within the open side of said channel and overlying said connecting member; and two series of fastening bolts one extending through one of said retaining rings, through said connecting member and through one of the side flanges aforesaid, and the other series through the other of said retaining rings, through said connecting member, and through the other of said side flanges.

2. A resilient gear of the class described comprising a hub portion; a rim surrounding said hub and having a series of inclined teeth; an annular yieldable connecting member interposed between said hub and rim and through which motion is transmitted from one of said members to the other; two annular flanges provided one upon said hub and the other upon said rim and which flanges engage with one another to thereby prevent lateral movement of said rim; and two concentric retaining rings overlying said connecting member and secured one to said rim and the other to said hub.

3. A resilient gear of the class described comprising a hub portion; a rim surrounding said hub and having a series of teeth; an annular yieldable connecting member interposed between said hub and rim and through which motion is transmitted from one of said members to the other; two members carried one by said hub and the other by said rim and which members engage with one another and act to prevent lateral movement of said rim; and two concentric retaining rings overlying said connecting member and secured one to said rim and the other to said hub, and the inner periphery of one of which rings contacts with the outer periphery of the other.

4. A resilient gear of the class described comprising two concentrically arranged portions one adapted to be secured to a shaft and the other having teeth adapted to mesh with the teeth of another gear; an annular yielding connecting member interposed between said gear portions and through which one portion is driven from the other, and which member is located within a similarly shaped recess provided partly in one and partly in the other of said portions; and two concentric holding members overlying said connecting member and adapted to hold the same in place relative to said gear portions and within the recess aforesaid.

5. A resilient gear of the class described comprising two concentrically arranged portions one adapted to be secured to a shaft and the other having teeth adapted to mesh with the teeth of another gear; an annular yielding connecting member interposed between said gear portions and through which one portion is driven from the other, and which member is located within a similarly shaped recess provided partly in one and partly in the other of said portions; means independent of said resilient connecting member for preventing lateral movement of the outer toothed portion of said gear relative to the inner portion thereof; and two concentric holding members overlying said connecting member and adapted to hold the same in place relative to said gear portions and within the recess aforesaid.

In testimony whereof I affix my signature.

ALEXANDER C. HAMILTON.